(12) United States Patent
Helmick et al.

(10) Patent No.: US 11,561,717 B2
(45) Date of Patent: Jan. 24, 2023

(54) DATA INTEGRITY PROTECTION OF SSDS UTILIZING STREAMS

(71) Applicant: Western Digital Technologies, Inc., San Jose, CA (US)

(72) Inventors: Daniel L. Helmick, Broomfield, CO (US); Peter Grayson, Grand Rapids, MI (US)

(73) Assignee: Western Digital Technologies, Inc., San Jose, CA (US)

( * ) Notice: Subject to any disclaimer, the term of this patent is extended or adjusted under 35 U.S.C. 154(b) by 220 days.

(21) Appl. No.: 16/883,918

(22) Filed: May 26, 2020

(65) Prior Publication Data
US 2021/0373769 A1   Dec. 2, 2021

(51) Int. Cl.
*G06F 3/06* (2006.01)
*G06F 12/0804* (2016.01)
*G06F 12/10* (2016.01)
*G06F 1/30* (2006.01)

(52) U.S. Cl.
CPC ............... *G06F 3/065* (2013.01); *G06F 1/30* (2013.01); *G06F 3/0604* (2013.01); *G06F 3/068* (2013.01); *G06F 12/0804* (2013.01); *G06F 12/10* (2013.01); *G06F 2212/1032* (2013.01); *G06F 2212/657* (2013.01)

(58) Field of Classification Search
CPC ........ G06F 3/065; G06F 3/0604; G06F 3/068; G06F 1/30; G06F 612/0804; G06F 612/10; G06F 2212/1032; G06F 2212/657
See application file for complete search history.

(56) References Cited

U.S. PATENT DOCUMENTS

| 6,968,059 | B1 | 11/2005 | Kimura |
| 9,239,781 | B2 | 1/2016 | Jones et al. |
| 10,417,190 | B1 | 9/2019 | Donlan et al. |
| 10,535,393 | B1 | 1/2020 | Balakrishnan |
| 2009/0031072 | A1 | 1/2009 | Sartore |

(Continued)

OTHER PUBLICATIONS

International Search Report and the Written Opinion for International Application No. PCT/US2020/065569 dated Apr. 4, 2021, 10 pages.

(Continued)

*Primary Examiner* — Prasith Thammavong
(74) *Attorney, Agent, or Firm* — Patterson & Sheridan, LLP; Steven H. VerSteeg (57) ABSTRACT

The present disclosure generally relates to methods of operating storage devices. The storage device comprises a controller comprising first random access memory (RAM1), second random access memory (RAM2), and a storage unit divided into a plurality of streams. When a write command is received to write data to a stream, change log data is generated and stored in the RAM1, the previous delta data for the stream is copied from the RAM2 to the RAM1 to be updated with the change log data, and the updated delta data is copied to the RAM2. The delta data stored in the RAM2 is copied to the storage unit periodically. The controller tracks which delta data has been copied to the RAM2 and to the storage unit. During a power failure, the delta data and the change log data are copied from the RAM1 or the RAM2 to the storage unit.

20 Claims, 6 Drawing Sheets

(56) References Cited

U.S. PATENT DOCUMENTS

| | | | |
|---|---|---|---|
| 2009/0172262 A1* | 7/2009 | Olbrich | G06F 12/0246 |
| | | | 711/E12.001 |
| 2010/0268864 A1 | 10/2010 | Ramiya Mothilal | |
| 2010/0332072 A1 | 12/2010 | Ishiko et al. | |
| 2011/0173380 A1 | 7/2011 | Yano et al. | |
| 2014/0304454 A1 | 10/2014 | Ellis et al. | |
| 2015/0317079 A1* | 11/2015 | Voigt | G06F 11/2064 |
| | | | 711/103 |
| 2016/0034188 A1* | 2/2016 | Bisht | G06F 3/0655 |
| | | | 710/53 |
| 2017/0123679 A1 | 5/2017 | Yoshii et al. | |
| 2018/0150220 A1* | 5/2018 | Pan | G06F 3/0659 |
| 2018/0329818 A1 | 11/2018 | Cheng et al. | |
| 2019/0065087 A1 | 2/2019 | Li et al. | |
| 2020/0012600 A1 | 1/2020 | Konoth et al. | |
| 2020/0034440 A1* | 1/2020 | Schneider | G06F 16/2255 |
| 2020/0097367 A1 | 3/2020 | Kim et al. | |
| 2020/0293401 A1 | 9/2020 | Lee et al. | |
| 2021/0096945 A1 | 4/2021 | Kotzur et al. | |
| 2022/0019502 A1 | 1/2022 | Mylavarapu | |
| 2022/0027349 A1* | 1/2022 | Shuo | G06F 16/2282 |

OTHER PUBLICATIONS

International Search Report and the Written Opinion for International Application No. PCT/US2020/065574 dated Apr. 29, 2021, 9 pages.

* cited by examiner

DATA INTEGRITY PROTECTION OF SSDS UTILIZING STREAMS

BACKGROUND OF THE DISCLOSURE

Field of the Disclosure

Embodiments of the present disclosure generally relate to storage devices, such as solid state drives (SSDs).

Description of the Related Art

Storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read and written to one or more erase blocks in the memory device. Each of the erase blocks is associated with a logical block address so that the SSD and/or the host device know the location of where the data, such as user data, parity data, metadata, and other applicable data, is stored. A logical to physical address (L2P) table stored in volatile memory of the SSD associates the LBA of the data to a physical address of where the data is stored in the SSD when the data is written. One or more erase blocks may be grouped together by their respective logical block addresses to form a plurality of streams.

Typically, one die or plane of a die in each stream is dedicated to storing parity data for the stream. As a command is received by the storage device to write data to a particular stream, the data associated with the command is written to the memory device, and parity data is simultaneously generated for the data in order to protect the data. Furthermore, data in flight, such as data not yet written to the memory device, may also be stored in a dedicated die or a dedicated plane of a die in each zone. The parity data and the data in flight are then stored in random-access memory (RAM) within the storage device.

However, the storage device generally comprises a very limited amount of RAM, as RAM is expensive from cost and total system design perspective. Since parity data is generated for each write command received, the parity data takes up a lot of the valuable RAM space, which may reduce the amount of RAM space available for other data, or may require a greater amount of RAM to be included in the storage device. Furthermore, data in flight may aggregate to a sizable amount and require a greater amount of RAM to be included in the storage device. Since RAM is volatile memory, data is lost when the device loses power. Thus, data storage reliability may be hindered and valuable information may be lost.

Therefore, what is needed is a new method of power fail protecting data in a storage device.

SUMMARY OF THE DISCLOSURE

The present disclosure generally relates to methods of operating storage devices. The storage device comprises a controller comprising first random access memory (RAM1), second random access memory (RAM2), and a storage unit divided into a plurality of streams. When a write command is received to write data to a stream, change log data is generated and stored in the RAM1, the previous delta data for the stream is copied from the RAM2 to the RAM1 to be updated with the change log data, and the updated delta data is copied to the RAM2. The delta data stored in the RAM2 is copied to the storage unit periodically. The controller tracks which parity data has been copied to the RAM2 and to the storage unit. During a power failure, the delta data and the change log data are copied from the RAM1 or the RAM2 to the storage unit.

In one embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit, a controller coupled to the non-volatile storage unit and the first volatile unit, and a second volatile memory unit. The controller is configured to receive one or more commands to write data to a first stream of the plurality of streams, generate change log data for the first stream in a temporary location in the second volatile memory unit, and copy the change log data for the first stream to the non-volatile storage unit upon experiencing a power failure event.

In another embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit comprising a plurality of ranks, wherein the plurality of ranks are divided into one or more sections. The storage device comprising a controller coupled to the non-volatile storage unit and the first volatile memory unit. The controller comprising a second volatile memory unit. The controller is configured to receive one or more write commands to write data to one or more streams of the plurality of streams, update delta data associated with at least one stream of the one or more streams for each of the one or more write commands received in the second volatile memory unit, wherein delta data is updated for a particular stream each time a command is received to write data to the particular stream, copy the updated delta data with the at least one stream from the second volatile memory unit to the plurality of ranks of the first volatile memory unit, and copy the one or more sections of the plurality of ranks of the first volatile memory unit to the non-volatile storage unit, wherein one section of the one or more sections is copied to the non-volatile storage unit at a time upon a predetermined amount of time expiring.

In another embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit comprising a plurality of ranks, wherein the plurality of ranks are divided into one or more sections. The storage device comprising a controller coupled to the non-volatile storage unit and the first volatile memory unit. The controller comprising a second volatile memory unit. The controller is configured to receive one or more write commands to write data to one or more streams of the plurality of streams, update delta data associated with at least one stream of the one or more streams for each of the one or more write commands received in the second volatile memory unit, wherein delta data is updated for a particular stream each time a command is received to write data to the particular stream, copy the delta data associated with the at least stream from the second volatile memory unit to the plurality of ranks of the first volatile memory unit, determine when a majority of the ranks within each section of the one or more sections have been updated or written to, and copy at least one section of the one or more sections to the non-volatile storage unit when the determination is made that the majority of the ranks within the at least one section have been updated or written to.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to methods of operating storage devices. The storage device comprises a controller comprising first random access memory (RAM1), second random access memory (RAM2), and a storage unit divided into a plurality of streams. When a write command is received to write data to a stream, change log data is generated and stored in the RAM1, the previous delta data for the stream is copied from the RAM2 to the RAM1 to be updated with the change log data, and the updated delta data is copied to the RAM2. The delta data stored in the RAM2 is copied to the storage unit periodically. The controller tracks which delta data has been copied to the RAM2 and to the storage unit. During a power failure, the delta data and the change log data are copied from the RAM1 or the RAM2 to the storage unit.

Figure 1:
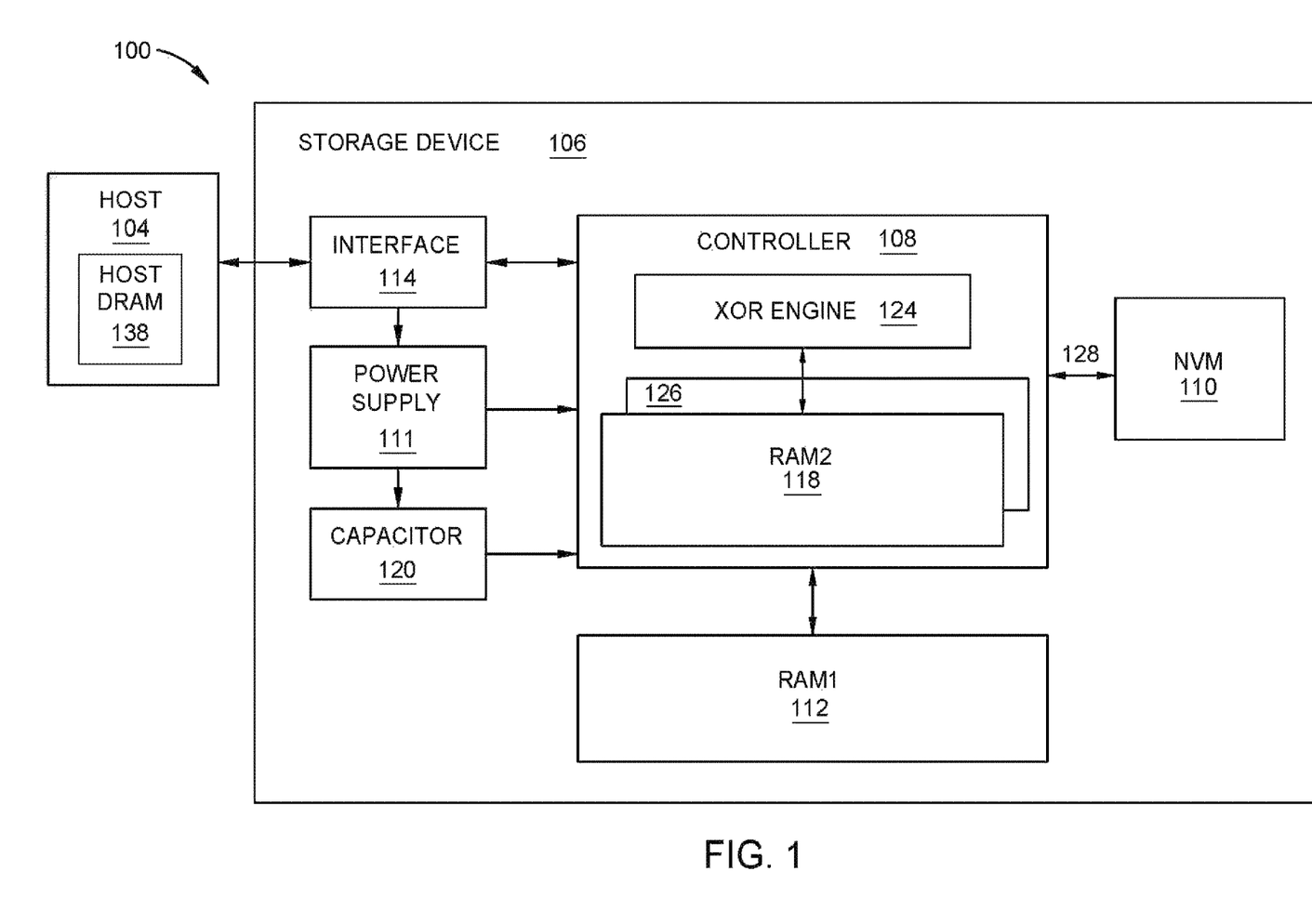
FIG. 1 is a schematic block diagram illustrating a storage system, according to one embodiment.

FIG. 1 is a schematic block diagram illustrating a storage system 100 in which storage device 106 may function as a storage device for a host device 104, in accordance with one or more techniques of this disclosure. For instance, the host device 104 may utilize a non-volatile storage unit 110, such as non-volatile memory (NVM), included in storage device 106 to store and retrieve data. The non-volatile storage unit 110 may be any type of non-volatile memory, such as MRAM, NAND, NOR, or HDD, for example. In the following descriptions, the non-volatile storage unit 110 is referenced as a non-volatile memory (NVM) 110 for simplification and exemplary purposes. The host device 104 comprises a host DRAM 138. In some examples, the storage system 100 may include a plurality of storage devices, such as the storage device 106, which may operate as a storage array. For instance, the storage system 100 may include a plurality of storage devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

The storage device 106 includes a controller 108, NVM 110, a power supply 111, a first random-access memory (RAM) or volatile memory 112, such as a dynamic random-access memory (DRAM), and an interface 114. The controller 108 may comprise a XOR engine 124 and a second RAM or volatile memory 118, a static random-access memory (SRAM). In the following descriptions, a first RAM or volatile memory 112 is referenced to as DRAM and a second RAM or volatile memory 118 is referenced as SRAM for simplification and exemplary purposes. In some examples, the storage device 106 may include additional components not shown in FIG. 1 for sake of clarity. For example, the storage device 106 may include a printed circuit board (PCB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 2.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, PCIe, non-volatile memory express (NVMe), OpenCAPI, GenZ, Cache Coherent Interface Accelerator (CCIX), Compute Express Link (CXL), Open Channel SSD (OCSSD), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, a single physical chip may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. Flash memory devices may include NAND or NOR based flash memory devices, and may store data based on a charge contained in a floating gate of a transistor for each flash memory cell. In NAND flash memory devices, the flash memory device may be divided into a plurality of blocks which may be divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Furthermore, NAND flash memory devices may be 2D or 3D devices, and may be single level cell (SLC), multi-level cell (MLC), triple level cell (TLC), or quad level cell (QLC). The controller 108 may write data to and read data from NAND flash memory devices at the page level and erase data from NAND flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory, which may be used by controller 108 to store information. Volatile memory may comprise one or more volatile memory devices. In some examples, the controller 108 may use volatile memory as a cache. For instance, the controller 108 may store cached information in volatile memory until cached information is written to the NVM 110. Examples of volatile memory 112 include, but are not limited to, RAM, DRAM 112, SRAM 118, and synchronous dynamic RAM (SDRAM (e.g., DDR1, DDR2, DDR3, DDR3L, LPDDR3, DDR4, LPDDR4, DDR5, LPDDR5, and the like)). As illustrated in FIG. 1, volatile memory may consume power received from the power supply 111.

The various types of volatile memories may be used with different access properties. For example, DRAM may be arranged for longer burst accesses to allow for improved bandwidth (BW) of the same access bus. Alternatively, DRAM may be used with smaller accesses such that random small accesses may have better latency. The controller 108 comprises additional optional SRAM and/or embedded MRAM 126. Embedded MRAM 126 is another alternative memory that may be used in another embodiment. Similarly, the access to the MRAM 126 can be optimized for different design purposes, but the quantity of embedded MRAM 126 in the SSD controller may be cost sensitive. Therefore, the choice of how much data and which data goes into the premium non-volatile memory and premium volatile memory will subject to system tradeoffs.

The storage device 106 includes a controller 108, which may manage one or more operations of the storage device 106. For instance, the controller 108 may manage the reading of data from and/or the writing of data to the NVM 110 via a toggle mode (TM) bus 128. In some embodiments, when the storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic to the NVM 110. In some embodiments, when the storage device 106 receives a write command from the host device 104, the controller 108 temporarily stores the data associated with the write command in the internal memory or buffer (not shown) before sending the data to the NVM 110.

The controller 108 may include a XOR engine 124 with logic and/or features to generate parity information. Exclusive OR (XOR) parity information may be used to improve reliability of storage device 106, such as enabling data recovery of failed writes or failed reads of data to and from NVM or enabling data recovery in case of power loss. The reliability may be provided by using parity information generated or computed based on data stored to storage device 106. Data may pass through the XOR engine 124 to be written to the NVM 110. The XOR engine 124 may generate a parity stream to be written to the SRAM 118. The SRAM 118 and the DRAM 112 may each contain a plurality of locations which data may be written to. Data may be transferred from an SRAM region (not shown) in the SRAM 118 to a DRAM region (not shown) in the DRAM 112, and vice-versa.

Figure 2:
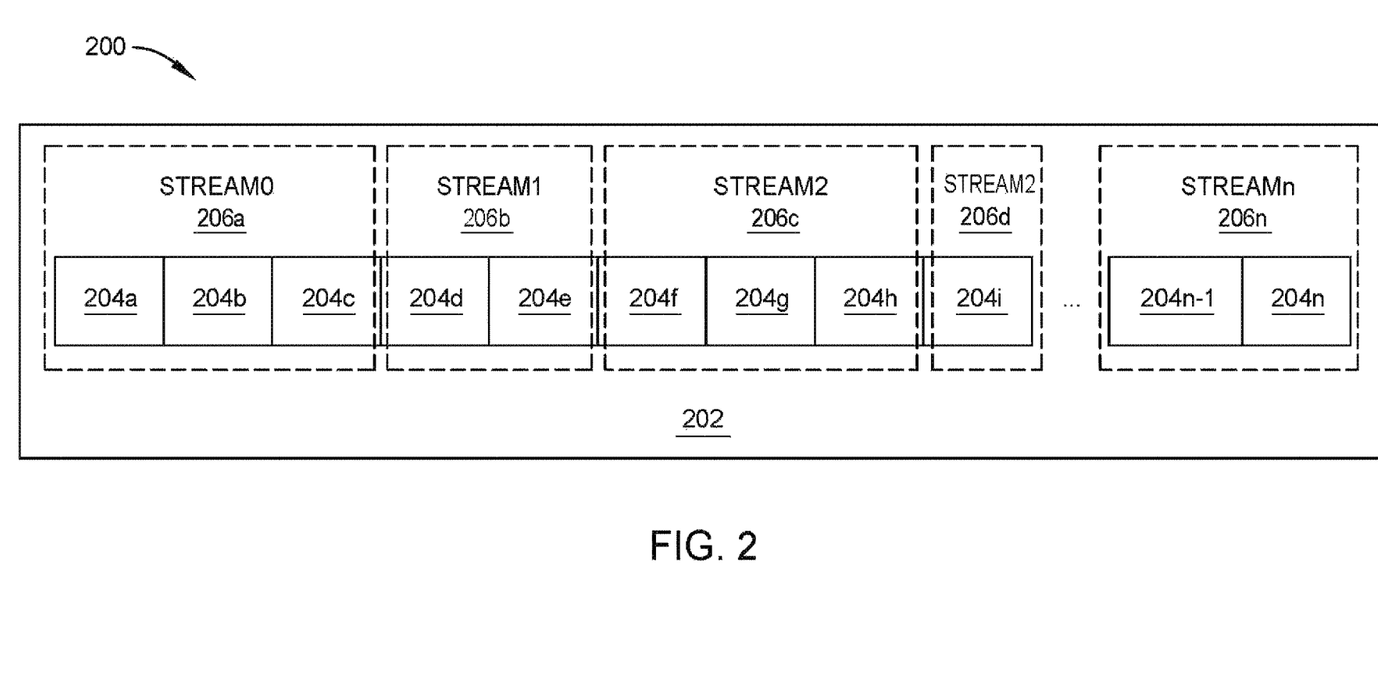
FIG. 2 illustrates a non-volatile storage unit comprising a plurality of dies, according to one embodiment.

FIG. 2 illustrates of a storage device 200 including a non-volatile storage unit 202 comprising a plurality of dies 204a-204n, according to one embodiment. In the following descriptions, the non-volatile storage unit 202 is referred to as a NVM for simplification and exemplary purposes. The NVM 202 may be the NVM 110 of FIG. 1.

In one embodiment, the NVM 202 is a NAND device. The NAND device comprises one or more dies. Each of the one or more dies comprises one or more planes. Each of the one or more planes comprises one or more erase blocks. Each of the one or more erase blocks comprises one or more wordlines (e.g., 256 wordlines). Each of the one or more wordlines may be addressed in one or more pages. For example, an MLC NAND die may use upper page and lower page to reach the two bits in each cell of the full wordline (e.g., 16 kB per page). Furthermore, each page can be accessed at a granularity equal to or smaller than the full page. A controller can frequently access NAND in user data granularity LBA sizes of 512 bytes. Thus, as referred to in the below description, NAND locations are equal to a granularity of 512 bytes. As such, an LBA size of 512 bytes and a page size of 16 KiB for two pages of an MLC NAND results in 32 LBAs per wordline. However, the NAND location size is not intended to be limiting, and is merely used as an example.

The capacity of the NVM 202 is divided into a plurality of streams 206a-206n (collectively referred to as streams 206), and each of the streams 206 comprises a plurality of dies 204. The NVM 202 of the storage device can be formatted into logical blocks such that the capacity is divided into a plurality of streams 206. Each of the plurality of streams 206 may have a state that is open and active, open and closed, empty, full, or offline. An empty stream switches to an open and active stream once a write is scheduled to the stream or if the stream open command is issued by the host. The controller can move a stream between stream open and stream closed states, which are both active states. If a stream is active, the stream comprises open blocks that may be written to, and the host may be provided a description of recommended time in the active state.

The term "written to" includes programming user data on 0 or more NAND locations in an erase block and/or partially filled NAND locations in an erase block when user data has not filled all of the available NAND locations. The term "written to" may further include moving a stream to full due to internal drive handling needs (open block data retention concerns because the bits in error accumulate more quickly on open erase blocks), the storage device closing or filling a stream due to resource constraints, like too many open streams to track or discovered defect state, among others, or a host device closing the stream for concerns such as there being no more data to send the drive, computer shutdown, error handling on the host, limited host resources for tracking, among others.

The active streams may be either open or closed. An open stream is an empty or partially full stream that is ready to be written to and has resources currently allocated. The data received from the host device with a write command may be programmed to an open erase block that is not currently filled with prior data. A closed stream is an empty or partially full stream that is not currently receiving writes from the host in an ongoing basis. The movement of a stream from an open state to a closed state allows the controller to reallocate resources to other tasks. These tasks may include, but are not limited to, other streams that are open, other conventional non-stream regions, or other controller needs.

Each of the streams 206 comprise a plurality of physical or erase blocks (not shown) of a memory unit or NVM 202, and each of the erase blocks are associated a plurality of logical blocks (not shown). Each of the streams 206 may be a different size, and are not required to be aligned to the capacity of one or more erase blocks of a NVM or NAND device. A stream write size (SWS) is an optimal write size agreed on between the host, such as the host 104 of FIG. 1, and the storage device, such as the storage device 106 of FIG. 1. The SWS may be a factory setting of the storage device 200. Write sizes received in sizes less than the SWS may still be written to the relevant stream; however, the write performance may be limited.

When the controller receives a command, such as from a host device (not shown) or the submission queue of a host device, the command is received with a stream ID (e.g., stream0), which tells the controller which stream 206 of the plurality of streams 206 to write the data associated with the command to. The host device may select the stream ID for a command based on data the host device wants grouped together. Thus, the data stored within each stream 206 may be related or grouped together as determined by the host, such as the host 104 of FIG. 1.

Because the host is not restricted to any size granularity, the controller, such as the controller 108 of FIG. 1, in the SSD must be prepared to grow or shrink the erase blocks (EBs). The SSD controller will select a granularity of one or more EBs. The controller will add units of the granularity of one or more EBs to the stream as more physical capacity is required by the streams. If data is unmapped, deallocated, or trimmed, the controller may choose to erase EBs and return them to the free pool of available EBs for the addition to a stream needing capacity. Further, there may be occasions where stream data is overwritten. Thus, the controller may execute garbage collection within one stream or among several streams concurrently to compact the physical space and reclaim EBs when the free pool is low.

In FIG. 2, each die is composed of two planes (not shown), and each plane comprises a plurality of erase blocks (not shown). User data may be stored in any die 204a-204n−1 of the NVM 202. At least one die 204n may be dedicated to storing the data in flight, such as unwritten user data received from the host or XOR data or parity data associated with the user data. Unwritten user data may comprise small lengths or amount of data (e.g., less than the size of one or more wordlines) that are stored in a parking location or buffer, such as a region in the SRAM 118 (shown in FIG. 3, for example), until the aggregated size of the data reaches a minimum size (e.g., the size of one or more wordlines), in which case the unwritten user data is written to the NVM 202. In one embodiment, data in flight may be stored in more than one die 204a-204n. Data in flight may be stored in any of the dies 204a-204n within the NVM 202, and is not limited to being stored in the last die 204n.

Figure 3:
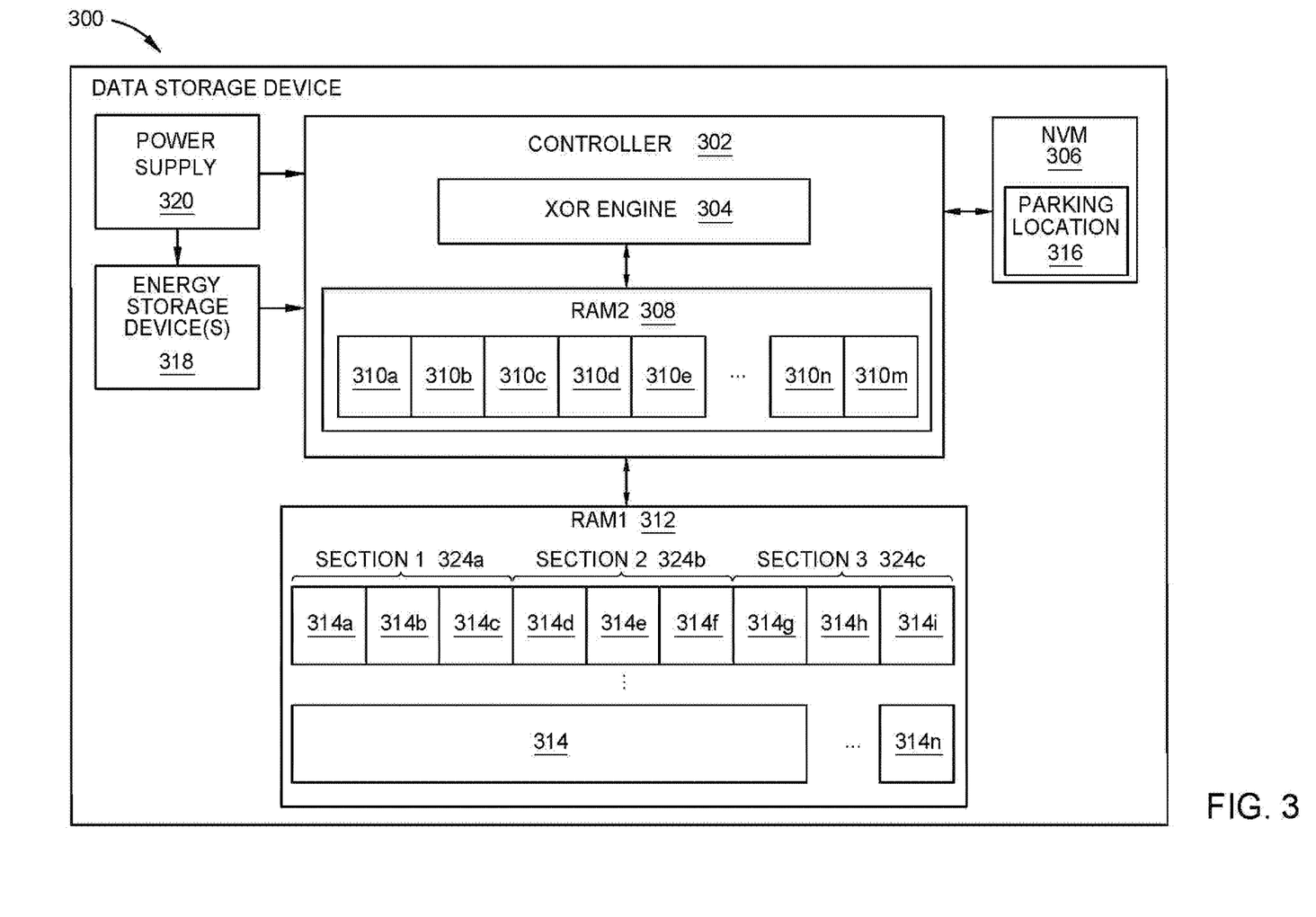
FIG. 3 is a schematic block diagram illustrating a data storage device, according to one embodiment.

FIG. 3 is a schematic block diagram illustrating a data storage device 300, according to one embodiment. Aspects of system 100 of FIG. 1 may be similar to the data storage device 300. In the following descriptions, a non-volatile storage unit 306 is referred to as a NVM, a first RAM or volatile memory 312 (i.e., a first RAM1) is referred to as DRAM, and a second RAM or volatile memory 308 (i.e., a second RAM2) is referred to as SRAM for simplification and exemplary purposes. In the storage device 300, the power supply 320 is coupled to one or more energy storage devices 318, such as one or more capacitors, and the controller 302.

The data storage device 300 may be the data storage device 106 of FIG. 1 or the storage device 200 of FIG. 2. The controller 302 may be controller 108 of FIG. 1, the parity or XOR engine 304 may be the XOR engine 124 of FIG. 1, the second volatile memory 308 may be the second volatile memory 118 of FIG. 1, and the first volatile memory 312 may be the first volatile memory 112 of FIG. 1. Similarly, the power supply 320 may be the power supply 111 of FIG. 1, the one or more energy storage devices 318 may be the one or more capacitors 120 of FIG. 1, and the non-volatile storage unit 306 may be the non-volatile storage unit 110 of FIG. 1 and/or the NVM 202 of FIG. 2.

The NVM 306 may comprise one or more multi-level cells, such as SLC, MLC, TLC, QLC, or any other iteration of a multi-level cell not listed. The NVM 306 may comprise the same one or more multi-level cells or comprise a mixture of the different one or more multi-level cells. The NVM 306 may store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.), such as user data, parity data, metadata, and any other suitable data to be stored in the NVM 306 not listed. The NVM 306 total capacity may be partitioned into a plurality of streams, such as the streams described in FIG. 1 and FIG. 2.

The phrases "parity data", "delta data", and "change log data" are utilized throughout as an example of data in flight, and are not intended to be limiting, as other forms of data in flight may be relevant. In other words, the delta data discussed in the examples below is data in flight and may include unwritten host data. Unwritten user or host data may comprise small lengths or amount of data (e.g., less than the size of one or more wordlines) that are stored in a parking location or buffer, such as the SRAM region 310m, until the aggregated size of the data reaches a minimum size (e.g., the size of one or more wordlines), in which case the unwritten user data is written to the NVM 110. Change log data is new delta data or data in flight (e.g., new parity data) that has not been used to update previous delta data and/or written to a DRAM region 314a-314n or to the NVM 306. The change log data is tracked using a L2P table, as discussed further below.

The parity data, deemed as data in flight, is considered the parity buffer and may protect the loss of data due to data corruption, erroneous bit transfer, power loss, and other causes of data loss. The delta data or portions of delta data may be generated or updated in the SRAM 308, and temporarily stored in the SRAM 308 and/or DRAM 312 before being copied to the NVM 306, for example. Delta data is stored in a suitable location in the NVM 306 dedicated for power fail protection of data, such as a parking location 316. When a power fail event occurs, data stored in the first volatile memory 312 and/or second volatile memory 308, such as delta data or parity data, may be lost unless the storage device comprises one or more energy storage devices 318 that have an appropriate amount of power to program the delta data from the first volatile memory 312 and/or the second volatile memory 308 to the parking location 316 of the NVM 306. The delta data in the parking location 316 may be utilized to recreate the relevant data lost in the volatile memory 308, 312 due to a power loss event.

The parking location 316 comprises one or more erase blocks dedicated to data parking in the NVM 306. The one or more erase blocks dedicated to data parking are determined at the beginning of drive life and may be changed based on erase block characteristics during the life of the drive. The one or more erase blocks of the parking location 316 are written to sequentially. Data stored in the parking location 316 may comprise data in flight, delta data, parity data, and tracking data. After a power loss event, the controller 302 may utilize the relevant data in the parking location 316 to recreate the data lost. The relevant data may be determined by some type of tracking, such as a header (i.e., an expected start point).

Furthermore, in case of power failure, one or more energy storage devices 318, such as batteries, capacitors, or vendor agreed system level power supplies following a host alert to a power fail event, located within the storage device 300 may store an adequate amount of energy to program data from the DRAM 312 to the NVM 306 to help prevent data loss, for example. In one embodiment, the storage device has "hot plug" capabilities, allowing the storage device to sense and detect the loss of incoming power supply, and to provide the necessary resources, such as energy storage devices, to become power fail safe. In another embodiment, the host alerts the storage device to a coming power loss, notifying the storage device to proactively become power fail safe.

The NVM 306 comprises one or more dedicated data parking sections for parking the data in flight or delta data, which may be any suitable multi-level cell memory (not shown). The term "parking" as used herein refers to a swapping of where the active stream information is stored. For example, data or information stored in the SRAM 308 may be parked in the DRAM 312, and data or information stored in the DRAM 312 may be parked in the NVM 306. The one or more dedicated data parking sections may be SLC, MLC, TLC, QLC, etc. and are examples of various embodiments for data parking sections. The one or more dedicated data parking sections of the NVM 306 comprises a plurality of parking locations. Such terminology is not meant to be limiting, but to provide an example of a possible embodiment of the reference.

The SRAM device 308 and the DRAM device 312 each individually comprises one or more dies. Each of the one or more dies comprises one or more ranks which comprises one or more banks. The banks are composed of rows and pages. The SRAM 308 in the controller 302 may be logically or physical separated into different SRAM areas or regions 310a-310n for use by the controller 302. Similarly, the DRAM 312 may be logically or physical separated into different DRAM areas or regions 314a-314n for use by the controller 302. A MRAM unit (not shown) inside of the controller 302 may be logically or physical separated into different MRAM areas or regions. External attachments of MRAM often have a vendor specific structure and access not covered here. A volatile memory bank, such as a SRAM bank or a DRAM bank, may be referred to throughout as a volatile memory region, such as a SRAM region or a DRAM region, for exemplary purposes.

The data storage device 300 comprises a first volatile memory 312 (e.g., DRAM or RAM1) comprising of one or more first volatile memory regions 314a-314n (e.g., DRAM regions or RAM1 regions). The term "n" refers to the last location in the sequence and is not limited to a maximum numeric value. Furthermore, the DRAM regions 314a-314n may be collectively referred to as DRAM regions 314. The DRAM regions 314 may be divided into a plurality of sections 324a-324-c (collectively referred to as "sections 324"), where the size of each section 324 is equal. In another embodiment, the DRAM regions 314 may be divided into a plurality of sections 324, where the size of each section 324 is different. A section 324 may comprise one or more DRAM regions 314, such as "x" amount of DRAM regions 314, where "x" refers to an integer. For example, a first section 324a comprises a first DRAM region 314a, a second DRAM region 314b, and a third DRAM region 314c. Likewise, a second section 324b comprises a fourth DRAM region 314d, a fifth DRAM region 314e, and a sixth DRAM region 314f. A third section 324c comprises a seventh DRAM region 314g, an eighth DRAM region 314h, and a ninth DRAM region 314i. The number of DRAM regions in a section and the number of sections listed are not intended to be limiting, but to provide an example of a possible embodiment. Moreover, while only three DRAM sections 324 are shown, any number of sections 324 may be included.

Each section (i.e., section 1 324a, section 2 324b, section 3324c, and so forth) of the DRAM 312 or SRAM regions 310a-310m may be programmed to a parking location 316 after one or more criteria is met. For example, one criteria may be that when one or more regions 310 of the SRAM 308 are storing change log data (e.g., new parity data) that has not yet been copied to the DRAM 312, the controller 302 may program the one or more regions 310 of the SRAM 308 storing change log data to a parking location 316, as discussed further below in FIG. 4A. In one embodiment, sections 324 of the DRAM 312 are periodically copied to the NVM 306 upon a predetermined amount of time expiring, as discussed further below in FIG. 4B. In another embodiment, one or more DRAM regions 314 storing updated delta data may be the majority of the DRAM regions 314a-314n within a section 324 (e.g., two DRAM regions of the three DRAM regions 314a-314c of the first section 324a), at which point the section 324 is copied to the NVM 306, as discussed further below in FIG. 4C.

Furthermore, each DRAM region may be associated with a stream, such that a section 324 comprising three DRAM regions 314 stores data for three streams. In one embodiment, each of the one or more sections stores data for about 1 stream to about 8 streams. For example, the first section 324a may store data for three streams, with the data of each stream being stored in an individual DRAM region 314.

Another criteria may be that after a predetermined amount of time has expired, the controller 302 may program a section of the DRAM 312 to a parking location 316. In one embodiment, the predetermined amount of time may be about 20 seconds (e.g., each section 324 is programmed to the NVM 306 once per minute). In another embodiment, the predetermined amount of time may be about one minute (e.g., each section 324 is programmed to the NVM 306 once every three minutes). The predetermined amounts of time listed is not intended to be limiting, but to provide examples of possible embodiments.

In one embodiment, each section of the DRAM 312, such as section 1 324a, section 2 324b, and section 3 324c, may be programmed to a parking location 316 sequentially upon the predetermined amount of time expiring. In another embodiment, each section of the DRAM 312 may be programmed to a parking location 316 randomly upon the predetermined amount of time expiring. In yet another embodiment, each section of the DRAM 312 may be programmed to a parking location 316 concurrently upon the predetermined amount of time expiring. In another embodiment, each section of the DRAM 312 may be programmed to a parking location 316 consecutively upon the predetermined amount of time expiring.

The DRAM 312 may comprise a first logical to physical (L2P) table (not shown) comprising pointers indicating or pointing to each physical location of the LBA of the parity data in the DRAM 312, to each physical location of the LBA of the updated parity data or delta data in the second volatile memory 308 (e.g., SRAM or RAM2), and to each physical location of the LBA of the data stored in the NVM 306. The controller 302 may utilize the L2P table to track the location of the relevant data, such as delta data or change log data, which has not been programmed to a SLC parking location 316. The NVM 306 may comprise a second L2P table (not shown), where the second L2P table of the NVM 306 is periodically updated to match the first L2P table of the DRAM 312. The second L2P table may be updated to match the first L2P table based on a predetermined amount of time, a number of updates to the first L2P table, or any other suitable criteria to update the second L2P table to match the first L2P table.

During a power failure event, delta data backup may be optimized by transferring the delta data from a second volatile memory region 310a-310n (e.g., SRAM region or RAM2 region) that has not been programmed to a parking location 316. Change log data in the SRAM 308 or host data not yet written to the NVM 306 is tracked in the L2P table as a "change log data", where "change log data" refers to new delta data (e.g., new parity data) that has not been used to update previous delta data and then written to a DRAM region 314a-314n or host data not yet written to the NVM 306. Programming delta data from a SRAM region 310a-310n to a parking location 316 may be faster than programming delta data from a SRAM region 310a-310n to a DRAM region 314a-314n and/or from a DRAM region 314a-314n to a parking location 316. Furthermore, delta data may be programmed in whole to the parking location 316 or partitioned into segments and programmed in the individual segments to the parking location 316.

By tracking the change log data in the L2P table, the updated delta data or updated parity data in the SRAM 308 and the DRAM 312 may be programmed to the parking location 316, instead of programming all delta data in the SRAM 308 and the DRAM 312 to the parking location 316, which allows for more overall data to be programmed to the NVM 306, as discussed further below in FIG. 4B. The delta data and/or the change log data may be stored in a temporary SRAM region, such as SRAM regions 310n and/or 310m, where data is stored for short periods of time. As a comparison, the remaining SRAM regions 310a-310n-1 may be non-temporary SRAM regions 310a-310n-1 where data may be stored for long periods of time. The SRAM 308 may comprise one or more temporary SRAM regions 310an, 310m and a plurality of non-temporary SRAM regions 310a-310n-1.

Figure 4A:
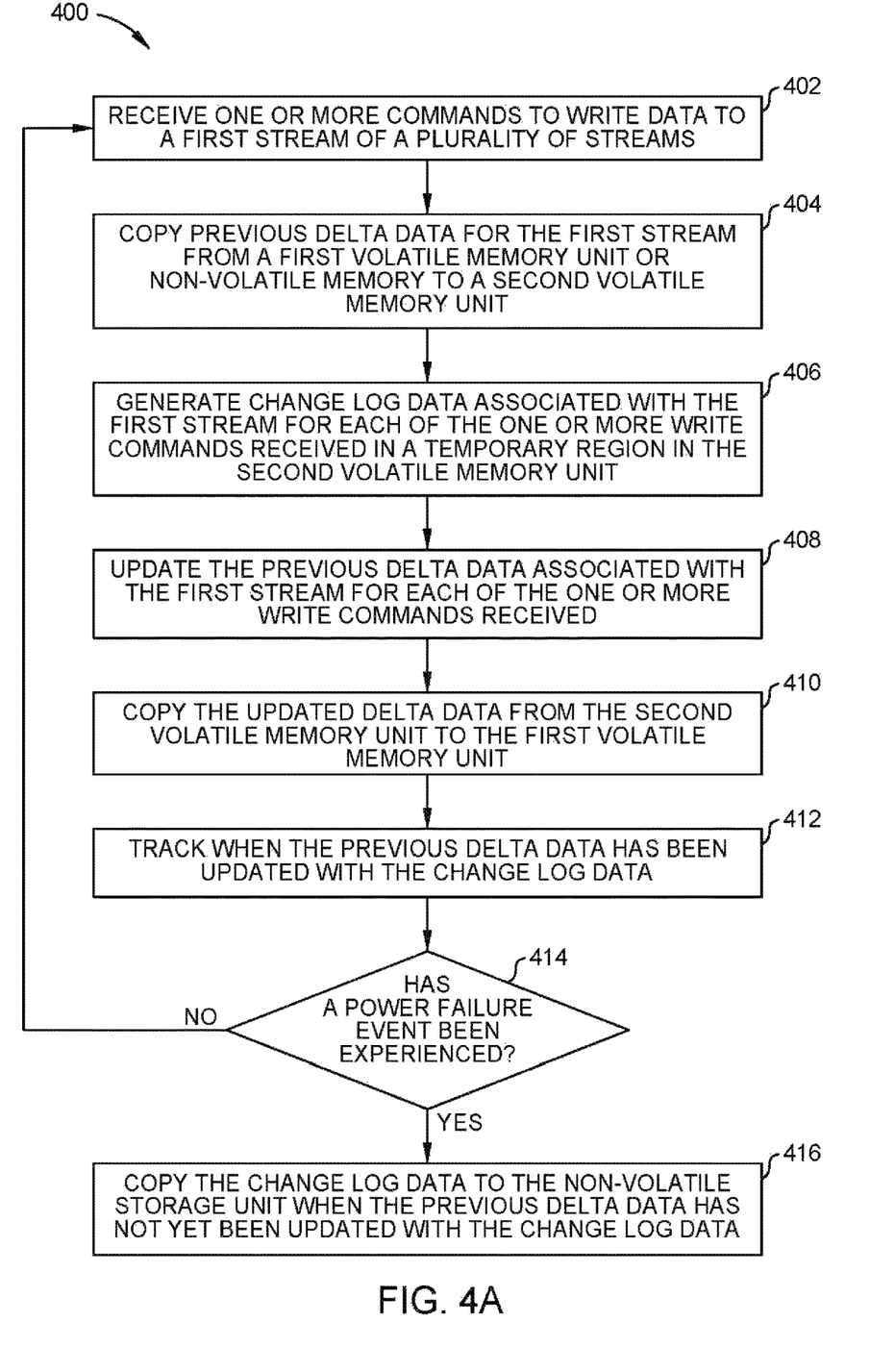
FIGS. 4A-4C are flowcharts illustrating methods of power fail protecting data in a storage device, according to various embodiments.
Figure 4B:
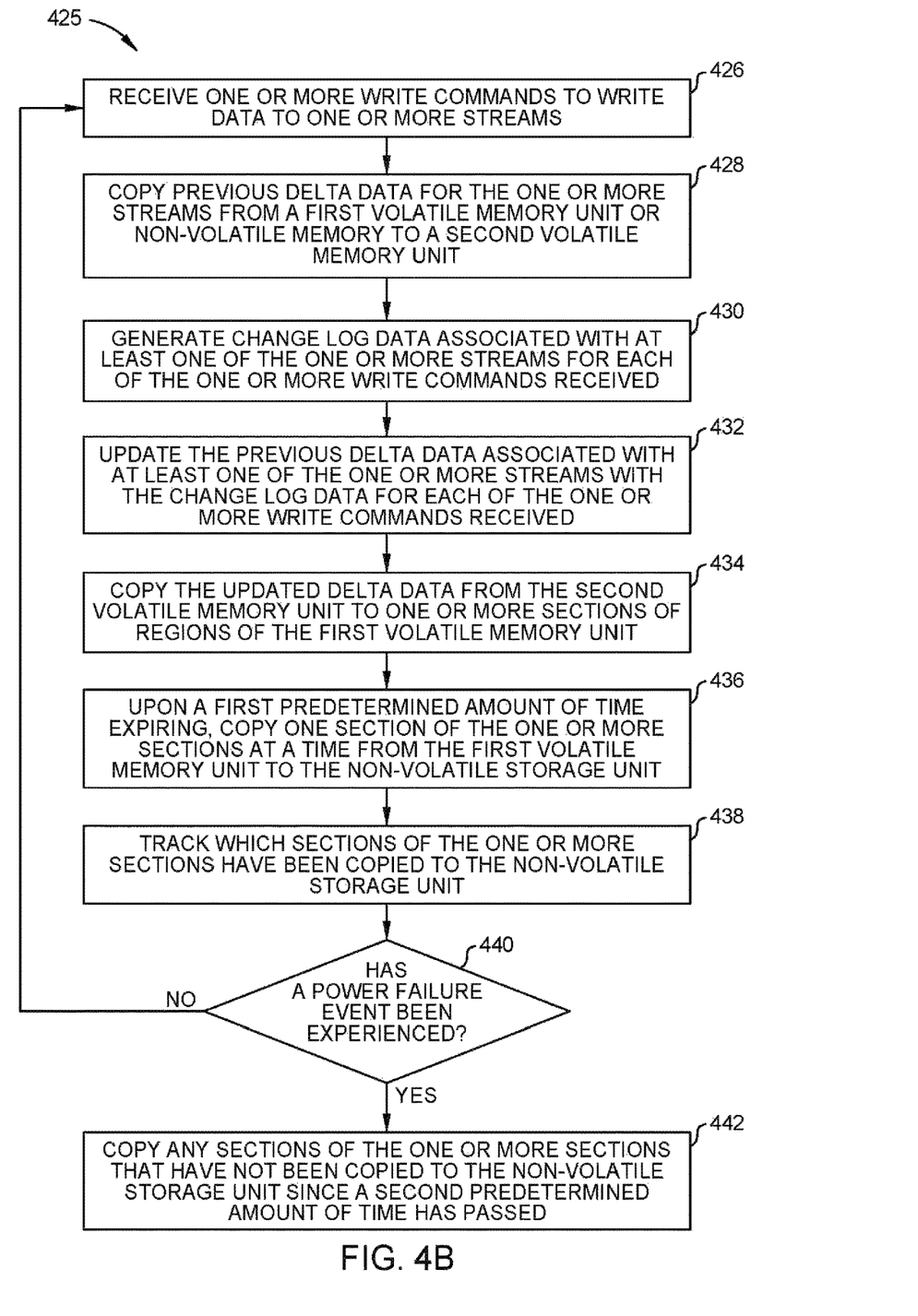
Figure 4C:
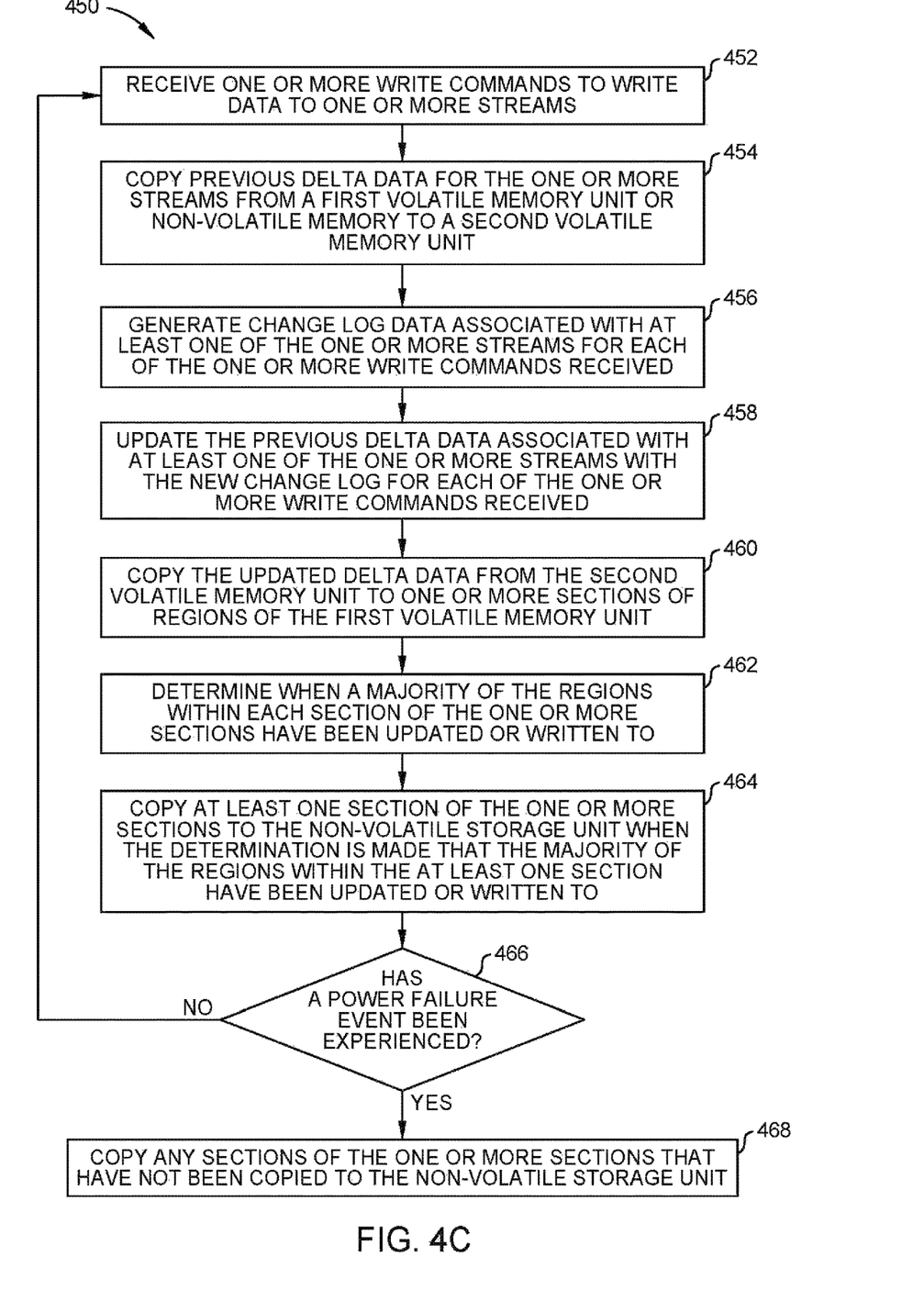

FIGS. 4A-4C are flowcharts illustrating methods of power fail protecting data in a storage device, according to various embodiments. Aspects of the storage system 100 of FIG. 1, the storage device 200, and/or the data storage device 300 of FIG. 3 may utilized or referenced in conjunction with the embodiments described in FIGS. 4A-4C. The methods 400, 425, 450 of FIGS. 4A-4C, respectively, are described with reference to FIG. 3, where applicable. Though references to the prior figures may not be mentioned in each aspect of the methods 400, 425, 450, the embodiments of the prior figures may be applicable to the methods 400, 425, and 450 described in FIGS. 4A-4C. Moreover, one or more aspects of the methods 400, 425, 450 may be used in combination with one another, or the methods 400, 425, 450 may be implemented individually.

Furthermore, a power fail event may occur during any operation (i.e., blocks) of the flowcharts of FIGS. 4A-4C. The storage device, such as those previously mentioned, comprises energy storage devices (e.g., batteries, capacitors, or vendor agreed system level power supplies following a host alert to power fail), such as the one or more energy storage devices 318 of FIG. 3, that store enough power for the controller, such as the controller 302 of FIG. 3, to complete the command and/or operation queue before reaching the power fail determination operation in the flowcharts of FIGS. 4A-4C. In one embodiment, the storage device has "hot plug" capabilities, allowing the storage device to sense and detect the loss of incoming power supply, and to provide the necessary resources, such as energy storage devices, to become power fail safe. In another embodiment, the host alerts the storage device to a coming power loss, notifying the storage device to proactively become power fail safe. Though the term "first stream" is used in the descriptions herein, the "first stream" may represent one or more streams that have a host read/write operation occurring to the stream(s).

FIG. 4A is a flowchart illustrating a method 400 of power fail protecting data in a storage device, according to one embodiment. One or more operations or blocks of the method 400 may be performed concurrently. A controller 302 receives one or more commands to write data to a first stream of a plurality of streams, such as a first stream0 206a of FIG. 2, at block 402. For example, the first write command comprises data to be written to a first stream already storing data. At block 404, the previous delta data for the first stream is copied from a DRAM region 314a-314n to a SRAM region 310a-310n. For example, first delta data stored in a first DRAM region 314a is copied to a first SRAM region 310a when the first write command to write data to the first stream is received by the controller 302.

At block 406, the parity or XOR engine 304 generates new change log data (i.e., new delta data or new parity data) associated with the first stream in a temporary region 310m in the SRAM 308 for each of the one or more write commands received. For example, the parity or XOR engine 304 generates first change log data for the first write command and writes the first change log data to the temporary SRAM region 310m. At block 408, the previous first delta data associated with the at least one stream, such as the previous delta data copied to a region in the SRAM 308 at block 404, is updated with the first change log data generated at block 406. In other words, the first change log data in the temporary SRAM region 310m updates the previous first delta data that was copied from the first DRAM region 314a to the first SRAM region 310a to form updated first delta data. The operations at block 404 and block 406 may occur concurrently.

At block 410, the updated first delta data (or a portion of the updated first delta data) is copied from the SRAM region 310a to a DRAM region, such as the eighth DRAM region 314h. At block 412, the controller utilizes the L2P table of the DRAM 312 to track when the previous first delta data has been updated with the first change log data, and to track the location of the updated first delta data (or a portion of the updated first delta data). However, the L2P table is not limited to tracking only updated delta data. The L2P table may have pointers tracking the location of old or previous delta data, change log data, user data, metadata, null data, etc. The location of the change log data may be stored in a separate L2P table, such as a delta change log L2P table. In various embodiment, a first L2P table tracks the location of the host data written to the NVM 306 and a second L2P table tracks the location of the change log data and/or the delta data stored in either SRAM regions 310a-310n or DRAM regions 314a-314n. If a power failure event occurs during any previous step of the method 400, such as during one of blocks 402-412, the controller 302 confirms or acknowledges the power failure event occurred block 414. The controller 302 then utilizes the power stored in the one or more energy storage devices 318 to program data that may be potentially lost, such as delta data and/or change log data, to a location in the NVM 306 at block 416. The controller utilizes the L2P table of the DRAM 312 to determine where the change log data, such as the first change log data, is located in the volatile memory, such as in the SRAM and/or DRAM, and copies any change log data to the NVM 306 when the previous delta data has not yet been updated with the change log data. For example, if the first change log data and/or the updated first delta data located in the SRAM region 310a has not yet been written to a DRAM region 314a-314n when the power failure occurs, then the controller 302 programs the first change log data and/or updated first delta data from the SRAM region 310a to a location in the NVM 306, such as a parking location 316, using the power provided by the one or more energy storage devices 318.

However, if a power failure event does not occur prior to block 414, then after tracking whether the previous first delta data has been updated with the first change log data at block 412, the controller 302 waits to receive one or more commands to write data to the one or more streams at block 402, and the method 400 repeats. The controller 302 may repeat method 400 with any stream of the plurality of streams, and the method 400 may be operating simultaneously with multiple commands to multiple different streams.

FIG. 4B is a flowchart illustrating a method 425 of power fail protecting data in a storage device, according to another embodiment. One or more operations or blocks of the method 425 may be performed concurrently. Aspects of FIG. 3 are used to illustrate the method 425. At block 426, a controller 302 receives one or more commands to write data to a first stream or a plurality of streams, such as a first stream0 206a of FIG. 2. For example, a first write command may be received to write data to a first stream storing data, and a second write command may be received to write data to a second stream storing data.

At block 428, the previous delta data for the first streams is copied from a DRAM region 314a-314n or from the parking location 316 to a SRAM region 310a-310n. For example, previous first delta data associated with the first stream stored in a first DRAM region 314a (or the parking location 316) is copied to a first SRAM region 310a. Similarly, previous second delta data associated with the second stream stored in a second DRAM region 314b is copied to a second SRAM region 310b.

At block 430, the parity or XOR engine 304 generates change log data associated with at least one of the one or more streams for each of the one or more write commands received. For example, the parity or XOR engine 304 generates first change log data for the first stream and writes the first change log data in a SRAM region, such as a temporary SRAM region 310n. Likewise, the parity or XOR engine 304 generates second change log data for the second stream and writes the second change log data in a SRAM region, such as the fifth SRAM region 310e.

At block 432, the previous delta data associated with the at least one stream currently stored in a SRAM region 310a-310n is then updated with the change log data for each of the one or more write commands. For example, the first previous delta data stored in the first SRAM region 310a is updated with the first change log data stored in the temporary SRAM region 310n, and the second previous delta data stored in the second SRAM region 310b is updated with the second change log data stored in the fifth SRAM region 310e to form updated first delta data associated with the first stream and updated second delta data associated with the second stream.

At block 434, the updated delta data (or a portion of the updated delta data) stored associated with the at least one stream stored in the SRAM 308 is copied from the SRAM 308 to one or more sections or regions of the DRAM 312. For example, the updated first delta data (or a portion of the updated first delta data) stored in the first SRAM region 310a is written to a DRAM region located in the first section 324a of the DRAM 312, such as the first DRAM region 314a, and the updated second delta data (or a portion of the updated second delta data) stored in the second SRAM region 310b is written to a DRAM region located in the second section 324b of the DRAM 312, such as the fourth DRAM region 314d.

At block 436, after a first predetermined amount of time has expired, such as about 20 seconds or about 1 minute, the controller 302 copies one section of the one or more sections 324 at a time from the first volatile memory unit 312 to the NVM 306. For example, after the predetermined amount of time has expired, the controller 302 copies the first section 324a of the DRAM 312 to a parking location 316 in the NVM 306.

At block 438, the controller 302 utilizes the L2P table stored in the DRAM 312 to track which sections of the one or more sections 324 have been copied to the NVM 306. In various embodiment, a first L2P table tracks the location of the host data written to the NVM 306 and a second L2P table whether sections 324 of the DRAM 312 have been copied to the NVM 306. Host data may be written non-sequentially to the NVM 306 and tracked non-sequentially in the first L2P table. If a power failure event occurs during any previous step of the method 425, such as during one of blocks 426-438, the controller 302 confirms or acknowledges the power failure event occurred at block 440.

At block 442, the controller 302 copies any sections of the one or more sections 324 that have not yet been copied to the NVM 306 since a second predetermined amount of time has passed. For example, the first section 324a of the DRAM 312 has been copied to the NVM 306, but the second section 324b and the third section 324c have not been copied to the NVM 306. The controller 302 programs the second section 324b and the third section 324c to the parking location 316 during a power loss event using the power provided by the one or more energy storage devices 318. The controller 302 utilizes the power stored in the one or more energy storage devices 318 to program data that may be potentially lost, such as delta data or parity data, to a location in the NVM 306. However, if a power loss event does not occur, then following the updating and tracking of the L2P table at block 438, the method 425 repeats blocks 426-438 one or more times. The controller 302 may repeat method 425 with any stream of the plurality of streams, and the method 425 may be operating simultaneously with multiple commands to multiple different streams.

FIG. 4C is a flowchart illustrating a method 450 of power fail protecting data in a storage device, according to another embodiment. One or more operations or blocks of the method 450 may be performed concurrently. Aspects of FIG. 3 are used to illustrate the method 450. A controller 302 receives one or more commands to write data to one or more streams, such as a first stream0 206a of FIG. 2, at block 452. For example, a first write command may be received to write data to a first stream storing data, and a second write command may be received to write data to a second stream already storing data.

At block 454, the previous delta data for each the one or more streams is copied from a DRAM region 314a-314n or from the parking location 316 to a SRAM region 310a-310n. For example, previous first delta data associated with the first stream stored in a first DRAM region 314a (or in the parking location 316) is copied to a first SRAM region 310a. Similarly, previous second delta data associated with the second stream stored in a second DRAM region 314b (or in the parking location 316) is copied to a second SRAM region 310b.

At block 456, the parity or XOR engine 304 generates change log data associated with at least one of the one or more streams (e.g., the first stream and the second stream) for each of the one or more write commands received. For example, the parity or XOR engine 304 generates first change log data for the first stream and writes the first change log data in a SRAM region, such as a temporary SRAM region 310n. Likewise, the parity or XOR engine 304 generates second change log data for the second stream and writes the second change log data in a SRAM region, such as the fifth SRAM region 310e.

At block 458, the previous delta data associated with the at least one stream (e.g., the first stream and the second stream) currently stored in a SRAM region 310a-310n is then updated with the change log data for each of the one or more write commands. For example, the first previous delta data stored in the first SRAM region 310a is updated with the first change log data stored in the temporary SRAM region 310n, and the second previous delta data stored in the second SRAM region 310b is updated with the second change log data stored in the fifth SRAM region 310e to form updated first delta data associated with the first stream and updated second delta data associated with the second stream.

At block 460, the updated delta data (or a portion of the updated delta data) associated with the at least one stream stored in the SRAM 308 is copied from the SRAM 308 to one or more sections or regions of the DRAM 312. For example, the updated first delta data (or a portion of the first delta data) stored in the first SRAM region 310a is written to a DRAM region located in the first section 324a of the DRAM 312, such as the first DRAM region 314a, and the updated second delta data (or a portion of the second delta data) stored in the second SRAM region 310b is written to a DRAM region located in the first section 324a of the DRAM 312, such as the second DRAM region 314b.

At block 462, the controller 302 determines when a majority of the regions 314a-314n within each section of the one or more sections 324 have been updated or written to. In various embodiment, a first L2P table tracks the location of the host data written to the NVM 306 and a second L2P table when a majority of the regions 314a-314n within each section of the one or more sections 324 have been updated or written to. Host data may be written non-sequentially to the NVM 306 and tracked non-sequentially in the first L2P table. At block 464, the controller 302 copies at least one section 324*a* of the one or more sections 324 to the NVM 306 upon the determination being made at block 462. For example, the first section 324*a* comprises three DRAM regions 314*a*, 314*b*, 314*c*. The first DRAM region 314*a* comprises the first updated delta data associated with the first stream and the second DRAM region 314*b* comprises the second updated delta data associated with the second stream. Thus, the controller 302 determines that two DRAM regions 314*a*, 314*b* of the first section 324*a* have been updated or written to. Since the criteria concerning the majority of regions within a section is met (i.e., at least 2 out of the 3 regions), the controller 302 programs the first section 324*a* to the parking location 316 of the NVM 306.

Thus, any sections 324 of the DRAM 312 comprising change log data or updated delta data that has not yet been copied to the NVM 306 are prioritized over other sections 324 of the DRAM 312 storing potentially old or outdated data that may have already been copied to the NVM 306 previously (e.g., if the sections 324 are copied to the NVM 306 upon a predetermined amount of time expiring, as discussed in the method 425).

If a power failure event occurs during any previous step of the method 450, such as during one of blocks 452-464, the controller 302 confirms or acknowledges the power failure event occurred at block 466. The controller 302 then copies any sections of the one or more sections 324 of the DRAM 312 that have not been copied to the NVM 306 at block 468. For example, the first section 324*a* of the DRAM 312 has recently been programmed to the parking location 316 of the NVM 306 at block 464. When a power loss event occurs, the controller 302 determines that the second section 324*b* and the third section 324*c* of the DRAM 312 have not been recently written to the NVM 306. The controller 302 then programs the second and third section 324*b*, 324*c* to the parking location 316 of the NVM 306. The controller 302 utilizes the power stored in the one or more energy storage devices 318 to program data that may be potentially lost, such as parity data, to a location in the NVM 306. However, if a power loss event does not occur at block 466, then the method 450 repeats blocks 452-464 one or more times. The controller 302 may repeat method 450 with any stream of the plurality of streams, and the method 450 may be operating simultaneously with multiple commands to multiple different streams.

When a power loss event occurs, the data stored in the volatile memory units is susceptible to being lost. However, the storage device may comprise one or more energy storage devices that store power to program data from the volatile memory units to the non-volatile storage unit. By incorporating various criteria, such as tracking change log data or delta data that has not been programmed to the non-volatile storage unit, determining a predetermined amount of time before programming a section of a volatile memory unit to the non-volatile storage unit, and/or determining a section of a volatile memory unit comprises a majority of change log or updated delta data (e.g., a majority of regions within a section comprising change log or updated delta data), the power usage of the storage device during a power loss event may be more efficient, allowing for more data to be programmed to the non-volatile storage unit, and ensuring loss of data is minimized or prevented.

In one embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit, a controller coupled to the non-volatile storage unit and the first volatile unit, and a second volatile memory unit. The controller is configured to receive one or more commands to write data to a first stream of the plurality of streams, generate change log data for the first stream in a temporary location in the second volatile memory unit, and copy the change log data for the first stream to the non-volatile storage unit upon experiencing a power failure event.

The controller is further configured to copy previous delta data for the first stream from the first volatile memory unit to the second volatile memory unit upon receiving the one or more commands to write data to the first, update the previous delta data with the change log data in the second volatile memory unit, copy the updated delta data from the second volatile memory unit to the first volatile memory unit, copy the updated delta data from the second volatile memory unit to the non-volatile storage unit, track when the previous delta data has been updated with the change log data, and copy the new delta data to the non-volatile storage unit when the previous delta data has not yet been updated with the change log data. The storage device further comprising one or more energy storage devices configured to provide power to the controller, wherein the controller is configured to use the power provided by the one or more energy storage devices to copy the change log data for the first stream to the non-volatile storage unit upon experiencing the power failure event. The first volatile memory unit stores a first logical to physical address table, the first logical to physical address table associating logical block addresses of data to a physical address of where the data is stored in the non-volatile storage unit. The controller is further configured to partition the first logical to physical address table into sections and update a second logical to physical address table stored in the non-volatile storage unit, wherein the second logical to physical address table is updated in the partitioned section size.

In another embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit comprising a plurality of ranks, wherein the plurality of ranks are divided into one or more sections. The storage device comprising a controller coupled to the non-volatile storage unit and the first volatile memory unit. The controller comprising a second volatile memory unit. The controller is configured to receive one or more write commands to write data to one or more streams of the plurality of streams, update delta data associated with at least one stream of the one or more streams for each of the one or more write commands received in the second volatile memory unit, wherein delta data is updated for a particular stream each time a command is received to write data to the particular stream, copy the updated delta data associated with the at least one stream of the one or more streams from the second volatile memory unit to the plurality of ranks of the first volatile memory unit, and copy the one or more sections of the plurality of ranks of the first volatile memory unit to the non-volatile storage unit, wherein one section of the one or more sections is copied to the non-volatile storage unit at a time upon a predetermined amount of time expiring.

The controller is further configured to copy the updated delta data from the first volatile memory unit to a parking section in the non-volatile storage unit. The predetermined amount of time is about 20 seconds. Each of the one or more sections is copied to the non-volatile storage about once per minute. The storage device further comprising one or more energy storage devices configured to provide power to the controller, wherein the controller is configured to use the power provided by the one or more energy storage devices to copy the one or more sections of the plurality of ranks of the first volatile memory unit to the non-volatile storage unit upon experiencing a power failure event. The controller is further configured to copy previous delta data associated with the at least one stream from the first volatile memory unit to the second volatile memory unit upon receiving the one or more commands and generate change log data associated with the at least one of the one or more streams for each of the one or more write commands received in the second volatile memory unit, wherein updating the delta data associated with the at least one of the one or more streams comprising updating the previous delta data with the change log data. The first volatile memory unit is DRAM or MRAM.

In another embodiment, a storage device comprises a non-volatile storage unit, wherein a capacity of the non-volatile storage unit is divided into a plurality of streams, and wherein the non-volatile storage unit comprises a plurality of dies. Each of the plurality of dies comprising a plurality of erase blocks. The storage device further comprising a first volatile memory unit comprising a plurality of ranks, wherein the plurality of ranks are divided into one or more sections. The storage device comprising a controller coupled to the non-volatile storage unit and the first volatile memory unit. The controller comprising a second volatile memory unit. The controller is configured to receive one or more write commands to write data to one or more streams of the plurality of streams, update delta data associated with at least one stream of the one or more streams for each of the one or more write commands received in the second volatile memory unit, wherein delta data is updated for a particular stream each time a command is received to write data to the particular stream, copy the delta data associated with the at least one stream from the second volatile memory unit to the plurality of ranks of the first volatile memory unit, determine when a majority of the ranks within each section of the one or more sections have been updated or written to, and copy at least one section of the one or more sections to the non-volatile storage unit when the determination is made that the majority of the ranks within the at least one section have been updated or written to.

Each of the one or more sections stores data for about 1 stream to about 5 streams. The storage device further comprising one or more energy storage devices configured to provide power to the controller, wherein the controller is configured to use the power provided by the one or more energy storage devices to copy all data stored in the first volatile memory unit to the non-volatile storage unit upon experiencing a power failure event. Each of the one or more sections comprising about 1 rank to about 10 ranks. The second volatile memory unit is SRAM, wherein the first volatile memory unit is DRAM, and wherein the non-volatile storage unit is NAND memory. The first volatile memory unit is MRAM.

While the foregoing is directed to embodiments of the present disclosure, other and further embodiments of the disclosure may be devised without departing from the basic scope thereof, and the scope thereof is determined by the claims that follow.

What is claimed is:

1. A storage device, comprising:
   a non-volatile storage unit, wherein a capacity of the non-volatile storage unit is divided into a plurality of streams, and wherein the non-volatile storage unit comprises a plurality of dies, each die of the plurality of dies comprising a plurality of erase blocks;
   a first volatile memory unit comprising a plurality of ranks, wherein the plurality of ranks is divided into one or more sections; and
   a controller coupled to the non-volatile storage unit and the first volatile memory unit, the controller comprising a second volatile memory unit, wherein the controller is configured to:
      receive one or more write commands to write data to one or more streams of the plurality of streams;
      update delta data associated with at least one stream of the one or more streams for each write command of the one or more write commands received in the second volatile memory unit, wherein delta data is updated for a particular stream each time a command is received to write data to the particular stream;
      copy the updated delta data associated with the at least one stream from the second volatile memory unit to the plurality of ranks of the first volatile memory unit; and
      copy the one or more sections of the plurality of ranks of the first volatile memory unit to the non-volatile storage unit, wherein one section of the one or more sections is copied to the non-volatile storage unit at a time responsive to a predetermined amount of time expiring.

2. The storage device of claim 1, wherein the controller is further configured to copy the updated delta data from the first volatile memory unit to a parking section in the non-volatile storage unit.

3. The storage device of claim 1, wherein the predetermined amount of time is 20 seconds.

4. The storage device of claim 1, wherein each section of the one or more sections is copied to the non-volatile storage once per minute.

5. The storage device of claim 1, further comprising one or more energy storage devices configured to provide power to the controller, wherein the controller is further configured to use the power provided by the one or more energy storage devices to copy the one or more sections of the plurality of ranks of the first volatile memory unit to the non-volatile storage unit responsive to experiencing a power failure event.

6. The storage device of claim 1, wherein the controller is further configured to:
   copy previous delta data associated with the at least one stream from the first volatile memory unit to the second volatile memory unit responsive to receiving the one or more commands; and
   generate change log data associated with the at least one stream for each write command of the one or more write commands received in the second volatile memory unit, wherein updating the delta data associated with the at least one stream comprises updating the previous delta data with the change log data.

7. The storage device of claim 1, wherein the first volatile memory unit is dynamic random-access memory (DRAM) or magnetoresistive random-access memory (MRAM).

8. A storage device, comprising:
a non-volatile storage unit, wherein a capacity of the non-volatile storage unit is divided into a plurality of streams;
a first volatile memory unit comprising a plurality of ranks, wherein the plurality of ranks is divided into one or more sections; and
a controller coupled to the non-volatile storage unit and the first volatile memory unit, the controller comprising a second volatile memory unit, wherein the controller is configured to:
receive one or more commands to write data to a first stream of the plurality of streams;
copy previous delta data associated with the first stream from the first volatile memory unit to the second volatile memory unit responsive to receiving the one or more commands;
update delta data associated with the first stream for each write command of the one or more write commands received in the second volatile memory unit;
copy the updated delta data associated with the first stream from the second volatile memory unit to the plurality of ranks of the first volatile memory unit; and
copy the one or more sections of the plurality of ranks of the first volatile memory unit to the non-volatile storage unit, wherein one section of the one or more sections is copied to the non-volatile storage unit at a time responsive to a predetermined amount of time expiring.

9. The storage device of claim 8, wherein the controller is further configured to update delta data for a particular stream each time a command is received to write data to the particular stream.

10. The storage device of claim 8, wherein the controller is further configured to:
generate change log data associated with the first stream for each write command of the one or more write commands received in the second volatile memory unit, wherein updating the delta data associated with the first stream comprises updating the previous delta data with the change log data;
track whether the previous delta data has been updated with the change log data; and
copy the change log data to the non-volatile storage unit responsive to the previous delta data having not yet been updated with the change log data.

11. The storage device of claim 8, wherein the controller is further configured to copy the updated delta data from the first volatile memory unit to a parking section in the non-volatile storage unit.

12. The storage device of claim 8, wherein:
the predetermined amount of time is 20 seconds; and
the controller is further configured to copy each of the one or more sections to the non-volatile storage once per minute.

13. The storage device of claim 8, further comprising one or more energy storage devices configured to provide power to the controller, wherein the controller is further configured to use the power provided by the one or more energy storage devices to copy the one or more sections of the plurality of ranks of the first volatile memory unit to the non-volatile storage unit responsive to experiencing a power failure event.

14. The storage device of claim 8, wherein:
the first volatile memory unit is dynamic random-access memory (DRAM) or magnetoresistive random-access memory (MRAM); and
the non-volatile storage unit comprises a plurality of dies, each die of the plurality of dies comprising a plurality of erase blocks.

15. A storage device, comprising:
a non-volatile storage unit, wherein a capacity of the non-volatile storage unit is divided into a plurality of streams, and wherein the non-volatile storage unit comprises a plurality of dies, each die of the plurality of dies comprising a plurality of erase blocks;
a first volatile memory means comprising a plurality of ranks, wherein the plurality of ranks is divided into one or more sections; and
a controller coupled to the non-volatile storage unit and the first volatile memory means, the controller comprising a second volatile memory unit, wherein the controller is configured to:
receive one or more write commands to write data to one or more streams of the plurality of streams;
update delta data associated with at least one stream of the one or more streams for each write command of the one or more write commands received in the second volatile memory unit, wherein delta data is updated for a particular stream each time a command is received to write data to the particular stream;
copy the updated delta data associated with the at least one stream from the second volatile memory unit to the plurality of ranks of the first volatile memory means;
determine whether a majority of the ranks within each section of the one or more sections has been updated or written to; and
copy the one or more sections of the plurality of ranks of the first volatile memory means to the non-volatile storage unit, wherein one section of the one or more sections is copied to the non-volatile storage unit at a time responsive to a predetermined amount of time expiring.

16. The storage device of claim 15, wherein the controller is further configured to:
copy at least one section of the one or more sections to the non-volatile storage unit responsive to the determination that the majority of the ranks within the at least one section has been updated or written.

17. The storage device of claim 15, wherein each section of the one or more sections is configured to store data for 1 stream to 5 streams.

18. The storage device of claim 15, wherein each section of the one or more sections is configured to comprise 1 rank to 10 ranks.

19. The storage device of claim 15, further comprising one or more energy storage devices configured to provide power to the controller, wherein the controller is further configured to use the power provided by the one or more energy storage devices to copy the one or more sections of the plurality of ranks of the first volatile memory means to the non-volatile storage unit responsive to experiencing a power failure event.

20. The storage device of claim 15, wherein:
the second volatile memory unit is static random-access memory (SRAM); and
the non-volatile storage unit is NAND memory.

* * * * *